United States Patent
Moore et al.

(10) Patent No.: US 7,963,180 B2
(45) Date of Patent: *Jun. 21, 2011

(54) WIRELESS SENSORS IN ROLL COVERS

(75) Inventors: Robert Hunter Moore, Pittsburgh, PA (US); Eric J. Gustafson, Winchester, VA (US); Franz Danzler, Köln (DE); Andreas Lutz, Nideggen (DE)

(73) Assignee: Stowe Woodward AG, Duren (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/551,882

(22) Filed: Sep. 1, 2009

(65) Prior Publication Data

US 2009/0320612 A1 Dec. 31, 2009

Related U.S. Application Data

(63) Continuation of application No. 12/164,556, filed on Jun. 30, 2008, now Pat. No. 7,581,456.

(51) Int. Cl.
*G01L 5/00* (2006.01)
(52) U.S. Cl. ................................. 73/862.55
(58) Field of Classification Search .......... 73/160, 73/862.55, 159, 760
See application file for complete search history.

(56) References Cited

U.S. PATENT DOCUMENTS

| | | | |
|---|---|---|---|
| 3,962,911 A | 6/1976 | Grenlund | 73/764 |
| 5,379,652 A | 1/1995 | Allonen | 73/862.55 |
| 5,383,371 A | 1/1995 | Laitinen | 73/862.55 |
| 5,535,240 A | 7/1996 | Carney et al. | 375/219 |
| 5,562,027 A | 10/1996 | Moore | 100/35 |
| 5,684,871 A | 11/1997 | Devon et al. | 375/239 |
| 5,699,729 A | 12/1997 | Moschel | 100/99 |
| 5,848,097 A | 12/1998 | Carney et al. | 375/219 |
| 5,874,723 A | 2/1999 | Hasegawa et al. | 235/472.01 |
| 6,006,100 A | 12/1999 | Koenck et al. | 455/466 |
| 6,328,681 B1 | 12/2001 | Stephens | 492/56 |
| 6,375,602 B1 | 4/2002 | Jones | 492/50 |
| 6,568,285 B1 | 5/2003 | Moore | 73/862.55 |
| 6,764,446 B2 | 7/2004 | Wolinsky et al. | |
| 6,910,376 B2 | 6/2005 | Maenpaa | 73/159 |
| 6,981,935 B2 * | 1/2006 | Gustafson | 492/10 |
| 7,185,537 B2 | 3/2007 | Muhs | 73/159 |
| 7,392,715 B2 * | 7/2008 | Moore et al. | 73/862.55 |
| 7,572,214 B2 * | 8/2009 | Gustafson | 492/9 |
| 2004/0053758 A1 | 3/2004 | Gustafson | |

FOREIGN PATENT DOCUMENTS

| | | |
|---|---|---|
| EP | 1653207 A2 | 5/2006 |
| JP | 2006164244 A | 6/2006 |

OTHER PUBLICATIONS

U.S. Appl. No. 10/441,636, filed May 21, 2003, entitled: Method For Forming Cover For Industrial Roll.

First Office Action of China Patent Application 200510118821.6 issued on May 26, 2010.

* cited by examiner

*Primary Examiner* — Max Noori
(74) *Attorney, Agent, or Firm* — Myers Bigel Sibley & Sajovec

(57) ABSTRACT

An industrial roll includes: a substantially cylindrical shell having an outer surface; a polymeric cover circumferentially overlying the shell outer surface; and a sensing system. The sensing system includes: a plurality of sensors embedded in the cover, each sensor configured to sense a data parameter; and a plurality of wireless transceivers, each transceiver connected to a respective sensor and embedded in the cover adjacent thereto. Each wireless transceiver is configured to transmit data signals from the respective sensor. Related methods and systems are also discussed.

20 Claims, 5 Drawing Sheets

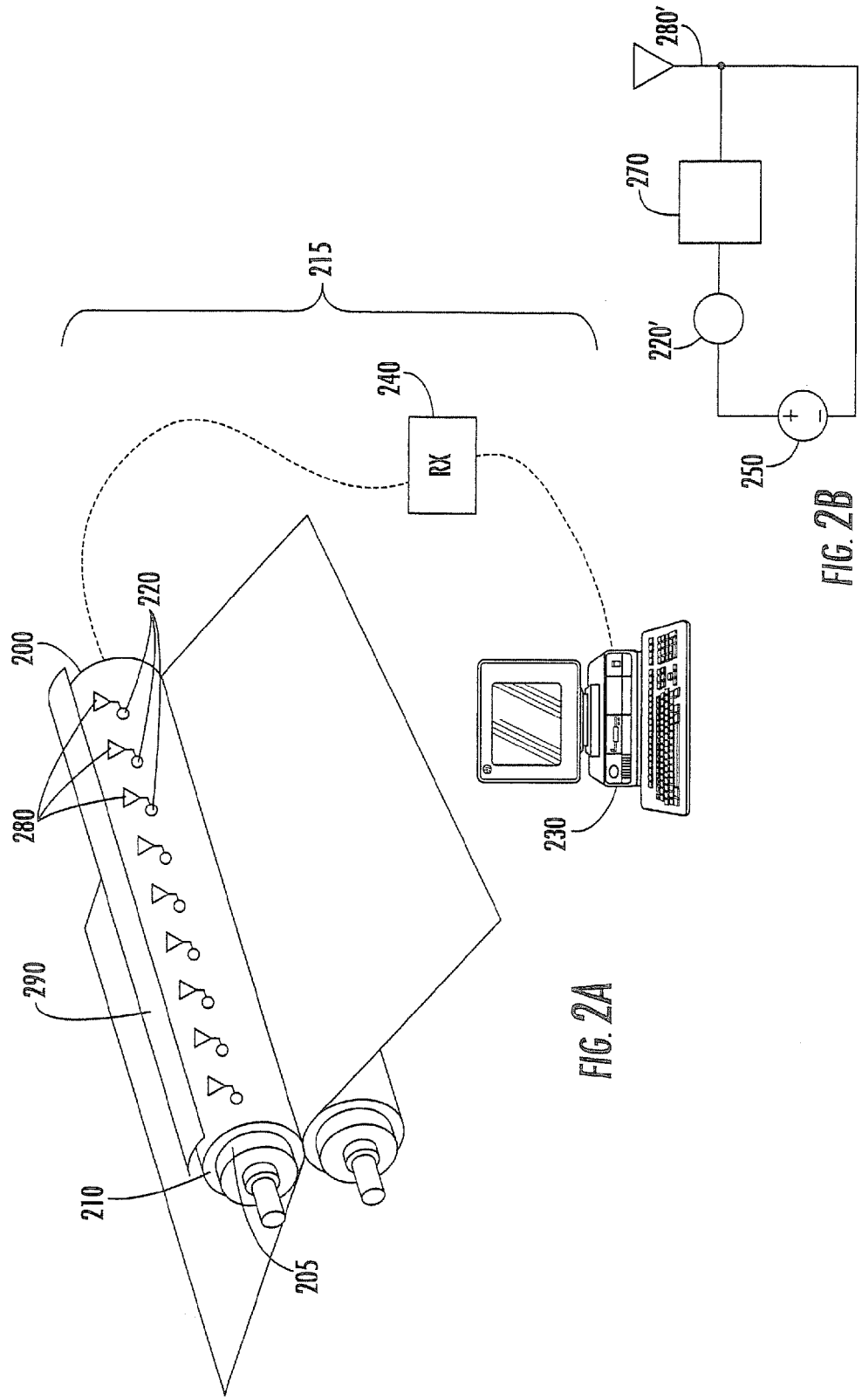

WIRELESS SENSORS IN ROLL COVERS

RELATED APPLICATION

This application claims priority from patent application Ser. No. 12/164,556, filed Jun. 30, 2008 now U.S. Pat. No. 7,581,456, issued on Sep. 1, 2009; which claims priority from patent application Ser. No. 10/977,948, filed Oct. 29, 2004, now U.S. Pat. No. 7,392,715 issued on Jul. 1, 2008; the disclosures of which are hereby incorporated herein in their entirety.

FIELD OF THE INVENTION

The present invention relates generally to industrial rolls, and more particularly to rolls for papermaking.

BACKGROUND OF THE INVENTION

Cylindrical rolls may be utilized in a number of industrial applications, especially those relating to papermaking. Such rolls may typically be employed in demanding environments in which they can be exposed to high dynamic loads and temperatures. As an example, in a typical paper mill, rolls can be used not only for transporting a fibrous web sheet between processing stations, but also, in the case of press section and calender rolls, for processing the web sheet itself into paper.

In the press section of the papermaking process, two or more cooperating rolls press the fibrous web as it travels on felts between the rolls. The "nip" is the contact region between two adjacent rolls through which the paper web passes. Each roll is typically constructed from a metallic shell covered by a polymeric cover. The characteristics of the rolls may be particularly important in papermaking, as the amount of pressure applied to the web during the nip press stage can be critical in achieving uniform sheet characteristics. Variations in nip pressure and width can affect sheet moisture content, thickness, and other sheet properties. Excessive pressure and/or width can cause crushing of fibers as well as holes in the resulting paper product. Additionally, the magnitude and area of pressure applied to the sheet may be uneven along or across the length of the roll, often resulting in paper of poor quality having uneven surface characteristics.

Other conditions on a nipped roll can also be important. For example, the stress and strain experienced by the roll cover in the cross machine direction can provide information about the durability and dimensional stability of the cover. In addition, the temperature profile of the roll can assist in identifying potential problem areas of the cover.

It is known to include pressure and/or temperature sensors in the cover of an industrial roll to measure operational parameters while the roll is in use. For example, U.S. Pat. No. 5,562,027 to Moore describes a roll having a plurality of sensors thereon for measuring pressure or temperature at several locations along the roll length and transmitting these measurements to a computer. Also, U.S. Pat. No. 5,699,729 to Moschel et al. describes a roll with a helically-disposed fiber that includes a plurality of pressure sensors embedded in the polymeric cover of the roll.

A conventional system for measuring operating parameters in a nip roll is illustrated in FIG. 1. Referring to FIG. 1, the nip roll 100 includes a cylindrical shell or core 105 and a cover 110 (typically formed of one or more polymeric materials) that encircles the shell 105. A sensing system for sensing pressure, temperature, or some other operational parameter of interest includes a plurality of sensors 120, each of which is embedded in the cover 110. The sensing system also includes a processor 130 that processes signals produced by the sensors 120. A plurality of wires 140 connect the plurality of sensors 120 to a multiplexer 150 and a transmitter 160 mounted on the roll head 170 for transmission to the processor 130.

Typically, two wires per sensor may be required. If multiple sensors are used on a roll, this may require multiple wires running along the length of the roll, which may need to be routed off the face of the roll to electronics units on the head of the roll. These wires may be routed within the layers of the roll cover. As the number of sensors increase, these electrical connections may become increasingly difficult to manage. For example, wire routing can be especially difficult in the case of variable crown rolls. As the head of a variable crown roll may frequently be removed, additional care may be required so that wires are not destroyed. In addition, routing multiple wires through the layers of the roll cover may weaken the integrity of the cover.

As such, several methods of minimizing the number of wires are known. For example, if a common ground wire is used, one wire per sensor (in addition to the ground wire) may be sufficient. Examples of such systems are discussed in U.S. Pat. No. 5,379,652 to Allonen and U.S. Pat. No. 5,383,371 to Laitinen. Further, if only one pressure sensor is in the nip at a time, two wires can be used to support multiple sensors. This is possible because only one sensor may be taking a pressure measurement (and thus transmitting over the wire) at one time. An example of such a system is discussed in U.S. Pat. No. 5,562,027 to Moore.

However, if more than one sensor is in the nip at a time, it may become difficult, if not impossible, to tell which signal is coming from which sensor. For example, for temperature measurements there is a negligible cyclical pulse, so it is nearly impossible to distinguish different temperature sensors using only two wires. Further, for smaller diameter rolls, the sensor spacing may become so close that only a few sensors may be used. In all cases, wire routing may be a difficult task. Therefore, it may be desirable to provide a sensing system that can provide measurements from multiple sensors on the roll using a minimal number of wires.

SUMMARY OF THE INVENTION

The present invention is directed to sensing systems for industrial rolls. As a first aspect, the present invention is directed to an industrial roll, including: a substantially cylindrical shell having an outer surface; a polymeric cover circumferentially overlying the shell outer surface; and a sensing system. The sensing system may include a plurality of sensors and a plurality of wireless transceivers. The plurality of sensors may be embedded in the cover, such that each sensor is configured to sense a data parameter. Each of the plurality of wireless transceivers may be connected to a respective sensor and embedded in the cover adjacent thereto for transmitting data signals from the sensor.

In some embodiments, the sensing system further includes: a wireless receiver operatively associated with the plurality of wireless transceivers for receiving data signals from the wireless transceivers; and a remote processor operatively associated with the receiver that processes the data signals conveyed thereby. The sensing system may also include a plurality of power sources, each power source connected to a respective sensor and wireless transceiver and embedded in the cover adjacent thereto. Each sensor and the respective wireless transceiver and power source can be included a unitary component.

In other embodiments according to the present invention, each wireless transceiver can be configured to output a code to distinguish its signal from the signals transmitted by the other wireless transceivers. Alternatively, each wireless transceiver may be configured to transmit at a different frequency than the other wireless transceivers. As a further alternative, each wireless transceiver can be configured to transmit the data signal from the respective sensor to the receiver in a predetermined sequence.

In some embodiments, the plurality of sensors may be located at a common circumferential position along a length of the roll. The plurality of sensors can also be located at a common axial position. Alternatively, the plurality of sensors may be located at scattered circumferential and axial positions on the roll or at multiple circumferential and axial positions on the roll. Further, the data parameter sensed by each sensor may relate to one of temperature, pressure, peak pressure, strain, nip width, and moisture.

In other embodiments, each power source connected to the sensors may be one of a battery, a rechargeable battery, and a capacitor. These embodiments may include a charging system for recharging each power source. The charging system may include a wireless charger configured to recharge each power source when the roll is not in operation. Alternatively, the charging system can include: a fixed member that spans a length of a roll; and a plurality of wireless chargers attached along a length of the member, each charger configured to recharge a power source using inductive coupling during roll operation. The fixed member may be a doctor blade assembly and/or may be arcuate in cross-section to wrap around a portion of a circumference of the roll.

In some embodiments, the charging system may include a plurality of piezoelectric devices, each piezoelectric device connected to at least one power source and embedded in the cover adjacent thereto, such that each piezoelectric device is configured to generate energy when compressed to recharge a respective power source. Alternatively, the charging system may include a wireless charger mounted to the roll and configured to generate energy from spurious vibrations and/or rotation of the roll to recharge each power source.

In other embodiments, the charging system may be an energy harvesting system configured to recharge each power source using energy harvested from vibrations, temperature differences, heat, and/or RF signals.

In some embodiments, the plurality of wireless transceivers may be transmitters. In other embodiments, the wireless transceivers may include infrared (IR) transmitters and receivers. The wireless transceivers may be configured in a mesh or a star-mesh topology.

In other embodiments, the sensing system may further include a plurality of peak detectors. Each peak detector may be connected between a respective sensor and transceiver. The data signals from the wireless transceivers may include peak nip pressure. The peak detectors may be reset responsive to a reset command, a specified number of revolutions, and/or a remote processor read operation.

As a second aspect, the present invention is directed to a method of collecting signal data in an industrial roll with a cover having a plurality of sensors embedded in the cover and configured to sense data parameters. The method may include the steps of providing a plurality of wireless transceivers, where each transceiver may be connected to a respective sensor and embedded in the cover adjacent thereto, and transmitting a data signal from a sensor to a processor with a respective wireless transceiver.

As a third aspect, the present invention is directed to a system for determining operating parameters in an industrial roll, including a plurality of sensors and a plurality of wireless transceivers. The plurality of sensors may be embedded in a polymeric cover circumferentially overlying an outer surface of the roll, such that each sensor is configured to sense a data parameter. Each of the plurality of wireless transceivers may be connected to a respective sensor and embedded in the cover adjacent thereto for transmitting data signals from the sensor. The system may also include a wireless receiver and a remote processor. The wireless receiver may be operatively associated with the plurality of wireless transceivers for receiving data signals from the wireless transceivers, and the remote processor may be operatively associated with the receiver for processing the data signals conveyed thereby.

BRIEF DESCRIPTION OF THE FIGURES

FIG. 2A is a perspective view of a nip roll and detecting system according to embodiments of the present invention.

FIG. 2B is a schematic diagram of a sensor and a wireless transceiver according to embodiments of the present invention.

DETAILED DESCRIPTION OF EMBODIMENTS OF THE INVENTION

Figure 1:
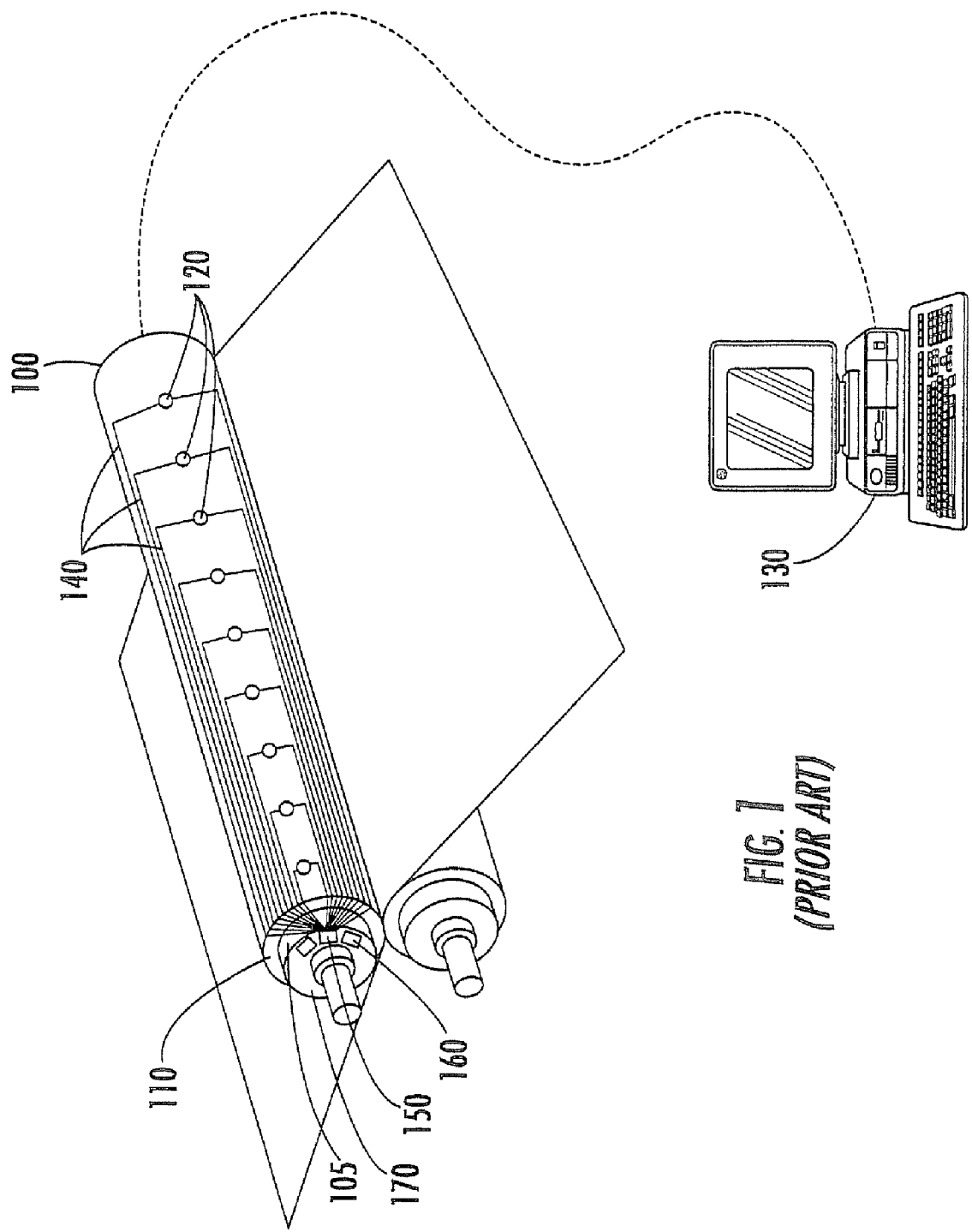
FIG. 1 is a perspective view of a conventional nip roll and detecting system.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Referring now to the figures, FIG. 2A illustrates a system for measuring operating parameters in a nip roll according to embodiments of the present invention. As shown in FIG. 2A, the nip roll 200 includes a cylindrical shell or core 205 and a cover 210 (typically formed of one or more polymeric materials) that encircles the shell 205. A sensing system 215 for sensing pressure, temperature, strain, moisture, nip width, and/or some other operational parameter of interest includes a plurality of sensors 220, each of which is embedded in the cover 210. The sensing system 215 further includes a plurality of wireless transceivers 280, with each wireless transceiver connected to at least one of the plurality of sensors 220 and embedded in the cover 210 adjacent thereto. Although FIG. 2A illustrates one wireless transceiver per sensor, a single wireless transceiver may be shared among multiple sensors in alternate embodiments according to the present invention. The wireless transceivers 280 transmit signals from their respective sensors 220 to a wireless receiver 240 in the sensing system 215. The sensing system 215 also includes a processor 230 that processes signals received from the sensors 220 via the receiver 240.

The sensors 220 can take any form recognized by those skilled in the art as being suitable for detecting data relating to the operational parameter of interest (e.g., pressure, temperature, strain, moisture, nip width, etc.). For example, temperature sensors may include thermocouples, resistance temperature detectors (RTDs), and thermistors. Pressure sensors may include piezoelectric sensors, piezoresistive sensors, force sensitive resistors (FSRs), fiber optic sensors, strain gage based load cells, and capacitive sensors. Nip width sensors may include piezoelectric sensors, piezoresistive sensors, force sensitive resistors (FSRs), fiber optic sensors, membrane switches, and capacitive sensors. Depending on the type of sensor, additional electronics may be required at each sensor location. The design and operation of the above sensors are well known in the art and need not be discussed further herein.

The processor 230 is typically a personal computer or similar data exchange device, such as the distributive control system of a paper mill that can process signals from the sensors 220 into useful, easily understood information from a remote location. Suitable exemplary processing units are discussed in U.S. Pat. Nos. 5,562,027 and 6,568,285 to Moore, the disclosures of which are hereby incorporated herein in their entireties.

Still referring to FIG. 2A, the wireless receiver 240 receives data from the sensors 220 via the wireless transceivers 280. Although not shown, wireless repeaters and/or routers may be placed within the cover to extend the distance that a signal can be transmitted. The repeaters or routers may pick up signals from other repeaters or routers and nearby sensors and transmit the signals forward to the receiver, allowing for reduced transmit power per transceiver.

FIG. 2B is a schematic diagram of a sensor location according to embodiments of the present invention as shown in FIG. 2A. Referring to FIG. 2B, at each sensor location, at least one sensor 220' is connected to a wireless transceiver 280' embedded in the roll cover 210 adjacent the sensor 220'. A power source 250, such as a battery, may also be connected to the sensor 220' at each sensor location, such that no external wires are needed for sensor operation. The power source 250 may also be an energy storage device, such as a capacitor.

For example, the sensor 220' may be a conventional passive sensor, such as the Micro-Sensys TELID2®T or the IQ-Mobil RDKS®, which may be capable of transmitting temperature measurements when energized. In a passive sensor, the power source 250 may be a capacitor or other passive energy storage device included in the sensor package that is configured to be recharged by energy from vibrations, heat, temperature differences, and/or RF signals to power the sensor 220'. Alternatively, the power source 250 may be an external power source, such as a battery, that is connected to the sensor 220' to improve the transmission range and/or speed limitations of the sensor 220' by providing additional power. The power source 250 may be configured to provide immediate power to energize the sensor 220' to transmit the temperature measurements using the transceiver 280' in response to an instruction from the processor 230.

Still referring to FIG. 2B, an electronics unit 270 for housing any additional electronics required by the particular sensor type may also be connected to the sensor 220'. The electronics unit 270 may further include a microprocessor for performing signal conditioning prior to transmission. The electronics unit 270 may include a peak detector as well. The sensor 220' and the electronics unit 270 may be positioned in close proximity to reduce the lead wire length between the two and thus the potential for noise. Alternatively, the sensor 220', wireless transceiver 280', power source 250, and electronics unit 270 may all be included within a single component, or sensing package, further reducing the potential for noise.

The wireless transceiver 280' is configured to transmit the data detected by the sensor 220' to the receiver 240, which is operatively associated with the processor 230. The wireless transceiver 280' may also be configured to receive and carry out instructions from the processor 230. Alternatively, the wireless transceiver 280' may be configured only as a transmitter for sending data to the processor 230. The wireless transceiver 280' may also be configured such that each transceiver 280' can support more than one sensor 220'. The wireless transceiver 280' and the receiver 240 may communicate via any wireless communications mode, such as radio frequency (RF) signaling.

In some embodiments, the wireless transceiver 280' and the receiver 240 may use infrared (IR) communication in place of or along with RF signaling. IR transmitters may be placed anywhere along the length of the cover. For nearly transparent covers, IR transmitters may be embedded within the cover. For opaque covers, IR transmitters may be placed near or at the outer surface of the roll cover. In some instances, it may be advantageous to place IR transmitters at the ends of the roll in the dub region.

In addition, the wireless transceiver 280' may be configured such that signals transmitted by the wireless transceiver 280' can be uniquely identified. For example, each wireless transceiver 280' may be configured to transmit on a different frequency, allowing the processor 230 to recognize a transmitted signal as belonging to a particular one of the wireless transceivers 280. As such, multiple wireless transceivers may transmit simultaneously. Alternatively, each wireless transceiver 280' may be configured to transmit a code that identifies its signal as distinct from the signals output by the other wireless transceivers 280. Thus, the processor 230 can uniquely identify each incoming signal as belonging to a particular wireless transceiver 280 based on the code. As a further alternative, the wireless transceivers may be configured to transmit sequentially, such that all of the wireless transceivers 280 transmit over the same frequency, but only one transceiver communicates with the receiver 240 at any one time. Therefore, the number and placement of sensors on the roll may no longer be limited by signal tracking concerns.

Still referring to FIG. 2B, the power source 250 at each sensor location may include any rechargeable energy storage device, such as a battery. The power source 250 may be recharged using a variety of methods. For example, the sensing system 215 may use a wireless recharger, similar to those used with portable phones, when the roll 200 is not in operation. During shutdown, a charging unit may be taped to the roll 200 at the sensor location to recharge the power source 250. As shutdowns may typically occur infrequently (for example, every 30 days), the sensing system 215 may use power sources that only require recharging at similar intervals.

Alternatively, the sensing system 215 may use inductive coupling to charge each power source 250 during roll operation. The charging unit may be connected to a doctor blade assembly or any member 290 (FIG. 2A) that spans the length of the roll 200. As such, each power source 250 may be recharged every time it rotates passes the charging unit member 290. For example, when a power source 250 at a sensor location approaches the charging unit member 290, it may see a strong RF signal, which may partially recharge the power source 250 upon each rotation. When the power source 250 has been recharged to a level sufficient to power the sensor 220' and/or the electronics unit 270, the power source 250 may send a signal back to the charging unit member 290. The charging unit member 290 may further be contoured to wrap around the roll 200 by a few degrees, allowing additional efficiency.

As a further alternative, the sensing system 215 may employ an on-board charger. Such a device may generate energy from low-level spurious vibrations. An alternate energy harvesting system may use piezoelectric devices embedded within the cover 210, as energy can be generated each time the piezoelectric device is compressed in the nip. As another alternative, the sensing system 215 may harvest energy from RF signals or from heat/temperature fluctuations. Where RF signals are used, the RF signals may also be used to communicate results.

As illustrated by the description above, the power source 250 at each sensor location supplies power to the sensor 220', and the wireless transceiver 280' transmits signals from the sensor 220' to the processor 230 via the wireless receiver 240, such that wires on the face of the roll 200 are no longer required. As such, the multiplexer 150 and transmitter 160 mounted on the roll head 170 in FIG. 1 may also be unnecessary. Therefore, according to embodiments of the present invention, problems associated with wire routing may be reduced and/or eliminated.

Figure 2C:
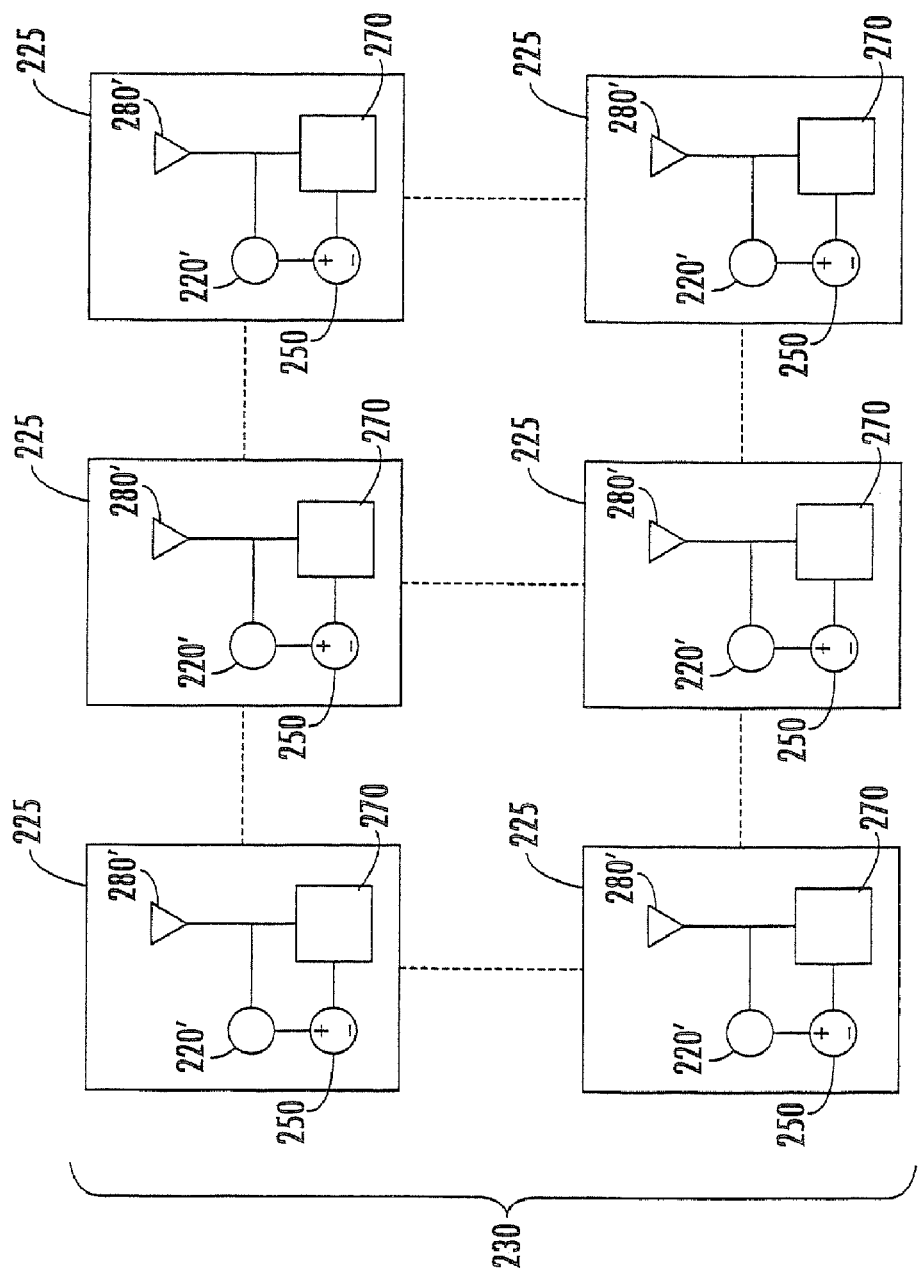
FIG. 2C is a schematic diagram of a sensor topology according to embodiments of the present invention.

FIG. 2C is a schematic diagram of a sensor topology according to embodiments of the present invention. Referring to FIG. 2C, each wireless sensing package, or "point" 225', may include a sensor 220', wireless transceiver 280', power source 250, and electronics unit 270 as shown in FIG. 2B. The points 225 are configured to communicate in a mesh topology 230, where each point self configures and communicates to the receiver gateway 240 using the most efficient path. Alternatively, the points 225 may be configured in a star mesh topology. Such meshes may be more robust than traditional communication techniques, as communication may flow around defective or damaged points and still reach the receiver 240. In addition, not all of the points 225 are required to be in range of the receiver 240 for successful communication.

Figure 3:
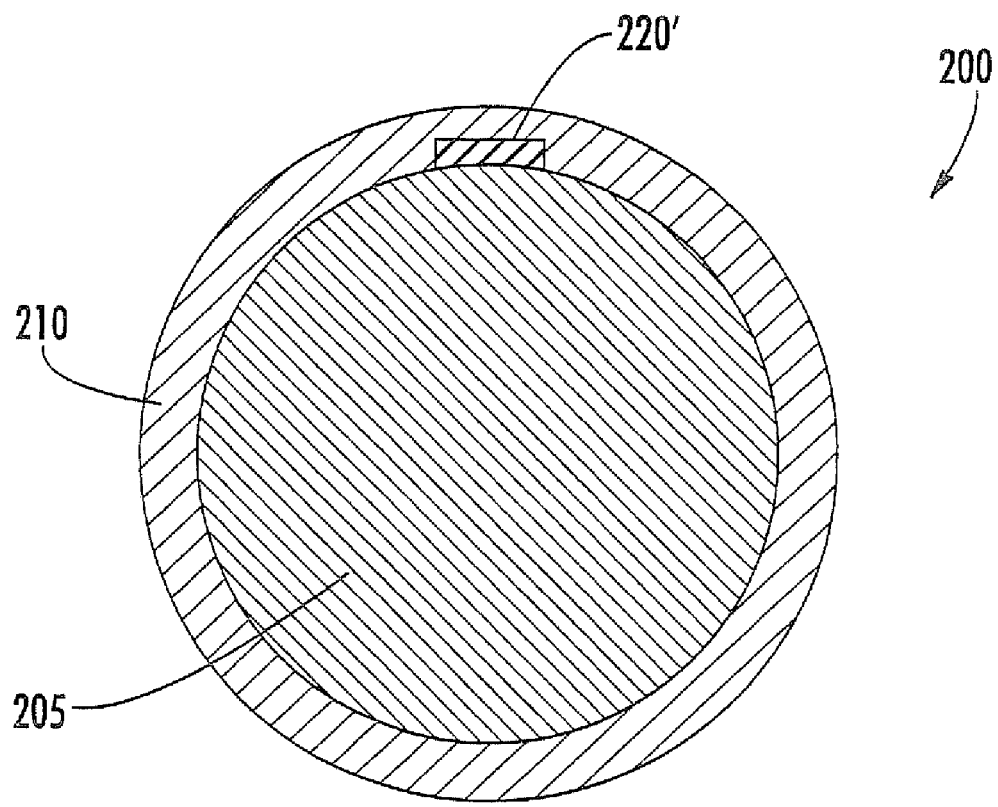
FIG. 3 is a cross-sectional view of a sensor mounted on a nip roll according to embodiments of the present invention.

FIG. 3 is a cross-sectional view of a sensor mounted on a nip roll according to embodiments of the present invention. Referring to FIG. 3, the nip roll 200 includes a hollow cylindrical shell or solid core 205 and a cover 210 that encircles the core 205. The core 205 is typically formed of steel or cast iron. For suction rolls, the core 205 is typically formed of a corrosion-resistant metallic material, such as stainless steel or bronze. The cover 210 can take any form and can be formed of any polymeric and/or elastomeric material recognized by those skilled in this art to be suitable for use with a plain or suction roll. Exemplary cover materials include natural rubber, synthetic rubbers such as neoprene, styrene-butadiene (SBR), nitrile rubber, chlorosulfonated polyethylene ("CSPE"—also known under the trade name HYPALON), EDPM (the name given to an ethylene-propylene terpolymer formed of ethylene-propylene diene monomer), epoxy, polyurethane, thermoset composites, and thermoplastic composites.

In many instances, the cover 210 will include at least two distinct layers: a base layer that overlies the core 205 and provides a bond thereto; and a topstock layer that overlies and bonds to the base layer and serves as the outer surface of the roll. Some rolls will also include an intermediate "tie-in" layer sandwiched by the base and top stock layers. Suitable materials and construction for the base and tie-in layers are discussed in U.S. Pat. No. 6,375,602 to Jones, U.S. Pat. No. 6,328,681 to Stephens, and U.S. patent application Ser. No. 10/441,636, the disclosures of each of which are hereby incorporated herein in their entireties. The materials for these layers are typically selected to provide the cover with a prescribed set of physical properties for operation. These can include the requisite strength, elastic modulus, and resistance to elevated temperature, water and harsh chemicals to withstand the papermaking environment. In addition, covers are typically designed to have a predetermined surface hardness that is appropriate for the process they are to perform, and they typically require that the paper sheet "release" from the cover without damage to the paper sheet. The cover may also include reinforcing and filler materials, additives, and the like.

Still referring to FIG. 3, a sensor 220' (smaller than shown) is embedded between the core 205 and the cover 210. An antenna may also be embedded within the cover 210. The sensor 220' may be mounted directly on the core 205 or on one of the layers of the cover 210. Mounting the sensor 220' on the core 205 may allow for increased cover integrity. However, sensor mounting may vary based on the particular application.

For example, peak temperature often occurs closer to the midpoint of the cover, so sensors may be placed on top of the base layer or tie-in layer to monitor the peak temperatures. This location may also be more sensitive to determine heating effects that are caused by loading variations. However, for temperature measurements for water-cooled rolls, it may be preferable to mount sensors at the core to determine whether the cooling water is adequate.

In addition, for moisture measurements, it may be preferable to mount moisture sensors at the interface most likely to collect water. Thus, for many harder and impermeable bases, it may be advantageous to mount the sensor on top of the base layer of the cover. Alternatively, for soft and permeable bases, the sensors may be mounted at the core. Also, any electronics required by the sensor could be located at the core, while the sensor could be placed elsewhere.

Figure 4A:
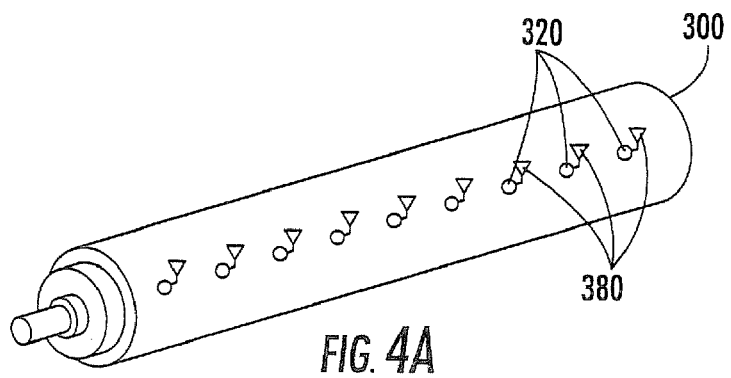
FIGS. 4A-D are perspective views of alternative sensor and wireless transceiver arrangements on nip rolls according to embodiments of the present invention.

FIGS. 4A-4D illustrate alternative sensor and wireless transceiver arrangements on the nip roll according to embodiments of the present invention. Since the wireless transceivers 280 transmit signals directly from the sensors 220 to the processor 230, sensor placement is no longer restricted by wire routing concerns. Further, as the wireless transceivers 280 allow unique identification of the signal from each sensor, the processor 230 can simultaneously track multiple sensors in the nip. For example, FIG. 4A illustrates a row of sensors 320 and wireless transceivers 380 placed at the same circumferential position along the length of the roll 300, parallel to the roll axis. As such, all of the sensors 320 on the roll 300 enter the nip simultaneously, enabling measurement of conditions along the length of the roll 300. For example, as the force exhibited by the roll is often greater at the middle of the roll than at the ends, placing multiple sensors along the entire roll enables measurement of force distribution along the entire roll.

Figure 4B:
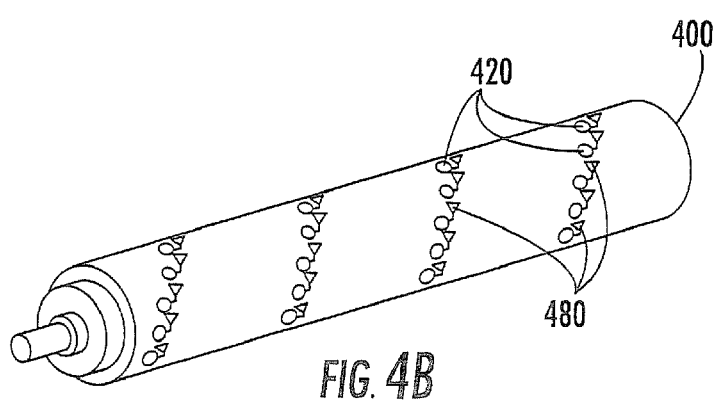
Figure 4C:
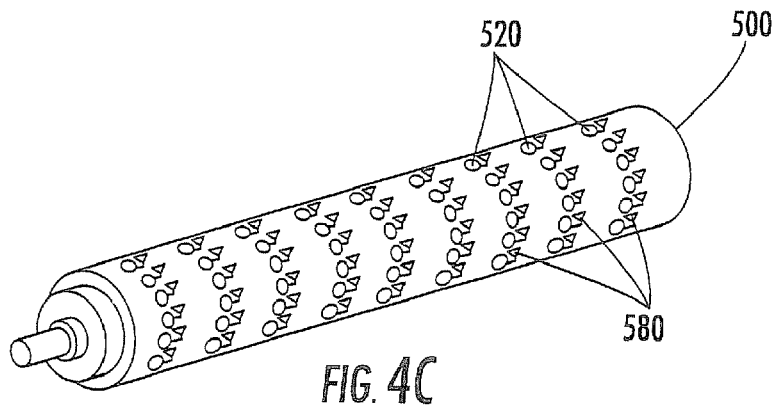
Figure 4D:
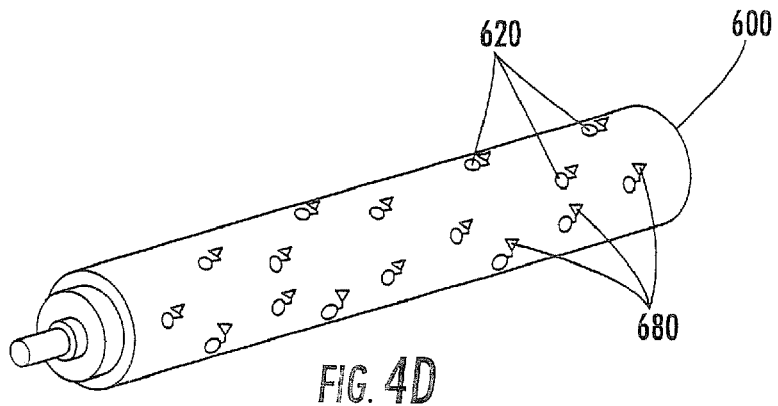

Alternatively, the sensors 420 and wireless transceivers 480 may be helically disposed on a roll 400, as illustrated in FIG. 4B, or placed at multiple axial and circumferential locations on a roll 500, as shown in FIG. 4C (sensors and wireless transceivers are designated therein at 520 and 580, respectively). As a further alternative, the sensors 620 and wireless transceivers 680 can be placed at random positions on the face of a roll 600, as illustrated in FIG. 4D. These configurations enable simultaneous measurement of conditions both inside and outside of the nip. Note that the invention is not to be limited to the configurations discussed herein, as the placement of the sensors and wireless transceivers on the roll can appear in other configurations as well. As such, embodiments of the present invention allow for sensor placement at virtually any point on the roll, eliminating concerns as to wire routing and/or sensor tracking in the nip.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention.

That which is claimed is:

1. An industrial roll, comprising:
    a substantially cylindrical shell having an outer surface;
    a polymeric cover circumferentially overlying the shell outer surface; and
    a sensing system comprising:
        a plurality of sensors embedded in the cover, each sensor configured to sense a data parameter; and
        a plurality of wireless transceivers, each transceiver connected to a respective sensor and embedded in the cover adjacent thereto for transmitting data signals from the sensor;
    wherein the plurality of sensors are located at multiple circumferential and axial positions on the roll; and
    wherein the data parameter sensed by each sensor relates to one of temperature, pressure, peak pressure, strain, nip width, and moisture.

2. The industrial roll of claim 1, wherein the sensing system further comprises:
    a wireless receiver operatively associated with the plurality of wireless transceivers for receiving data signals from the wireless transceivers; and
    a remote processor operatively associated with the receiver that processes the data signals conveyed thereby.

3. The industrial roll of claim 2, further comprising a plurality of power sources, each power source connected to a respective sensor and wireless transceiver and embedded in the cover adjacent thereto.

4. The industrial roll of claim 3, wherein each sensor and the respective wireless transceiver and power source comprise a unitary component.

5. The industrial roll of claim 1, wherein each wireless transceiver is configured to output a code to distinguish its signal from the signals transmitted by the other wireless transceivers.

6. The industrial roll of claim 1, wherein each wireless transceiver is configured to transmit at a different frequency than the other wireless transceivers.

7. The industrial roll of claim 2, wherein each wireless transceiver is configured to transmit the data signal from the respective sensor to the receiver in a predetermined sequence.

8. The industrial roll of claim 1, wherein the plurality of sensors are located at a common circumferential position along a length of the roll.

9. The industrial roll of claim 1, wherein the plurality of sensors are located at a common axial position.

10. The industrial roll of claim 1, wherein the plurality of sensors are located at scattered circumferential and axial positions on the roll.

11. The industrial roll of claim 3, wherein each power source comprises one of a battery, a rechargeable battery, and a capacitor.

12. The industrial roll of claim 11, further comprising a charging system for recharging each power source.

13. The industrial roll of claim 1 wherein the wireless transceivers comprise infrared (IR) transmitters and receivers.

14. The industrial roll of claim 1, wherein the plurality of wireless transceivers are transmitters.

15. The industrial roll of claim 1, wherein the transceivers are configured in a mesh or a star-mesh topology.

16. The industrial roll of claim 1, wherein the sensing system further comprises a plurality of peak detectors, wherein each peak detector is connected between a respective sensor and transceiver.

17. The industrial roll of claim 16, wherein the peak detector is reset responsive to a reset command, a specified number of revolutions, and/or a remote processor read operation.

18. The industrial roll of claim 16, wherein the data signals from the wireless transceivers comprise peak nip pressure.

19. An industrial roll, comprising:
    a substantially cylindrical shell having an outer surface;
    a polymeric cover circumferentially overlying the shell outer surface; and
    a sensing system comprising:
        a plurality of sensors embedded in the cover, each sensor configured to sense a data parameter; and
        a plurality of wireless transceivers, each transceiver connected to a respective sensor and embedded in the cover adjacent thereto for transmitting data signals from the sensor;
    wherein the plurality of sensors are located at multiple circumferential and axial positions on the roll; and
    wherein the plurality of wireless transceivers are transmitters.

20. An industrial roll, comprising:
    a substantially cylindrical shell having an outer surface;
    a polymeric cover circumferentially overlying the shell outer surface; and
    a sensing system comprising:
        a plurality of sensors embedded in the cover, each sensor configured to sense a data parameter; and
        a plurality of wireless transceivers, each transceiver connected to a respective sensor and embedded in the cover adjacent thereto for transmitting data signals from the sensor;
    wherein the data parameter sensed by each sensor relates to one of temperature, pressure, peak pressure, strain, nip width, and moisture; and
    wherein the plurality of wireless transceivers are transmitters.

* * * * *

UNITED STATES PATENT AND TRADEMARK OFFICE
CERTIFICATE OF CORRECTION

PATENT NO. : 7,963,180 B2  
APPLICATION NO. : 12/551882  
DATED : June 21, 2011  
INVENTOR(S) : Moore et al.

Page 1 of 1

It is certified that error appears in the above-identified patent and that said Letters Patent is hereby corrected as shown below:

On the Title Page:

Item (56) References Cited, U. S. Patent Documents: Please add the following
-- 2002/0045921   4/2002   Wolinsky et al -- and
-- 7,406,876   8/2008   Krozer et al --

Foreign Patent Documents: Please add the following
-- DE   199 10 197   C1   10/2000 --

Other Publications: Please add the following
-- Partial European Search Report for EP application no. 05 01 6969, dated 09/02/2009. --

Signed and Sealed this
Eighteenth Day of October, 2011

David J. Kappos
*Director of the United States Patent and Trademark Office*